United States Patent
Thomas

(10) Patent No.: US 10,718,118 B2
(45) Date of Patent: Jul. 21, 2020

(54) SIMULATED ROCK PANELS

(71) Applicant: Dale Thomas, Redding, CA (US)

(72) Inventor: Dale Thomas, Redding, CA (US)

( * ) Notice: Subject to any disclaimer, the term of this patent is extended or adjusted under 35 U.S.C. 154(b) by 0 days.

(21) Appl. No.: 15/315,261

(22) PCT Filed: Nov. 9, 2016

(86) PCT No.: PCT/US2016/061177
§ 371 (c)(1),
(2) Date: Nov. 30, 2016

(87) PCT Pub. No.: WO2017/083415
PCT Pub. Date: May 18, 2017

(65) Prior Publication Data
US 2018/0238059 A1   Aug. 23, 2018

Related U.S. Application Data

(60) Provisional application No. 62/252,868, filed on Nov. 9, 2015.

(51) Int. Cl.
| | | |
|---|---|---|
| *B28B 7/00* | (2006.01) | |
| *B28B 11/00* | (2006.01) | |
| *B28B 19/00* | (2006.01) | |
| *C04B 28/06* | (2006.01) | |
| *B28B 3/00* | (2006.01) | |

(Continued)

(52) U.S. Cl.
CPC ............ *E04F 13/0873* (2013.01); *B28B 3/00* (2013.01); *B28B 3/02* (2013.01); *B28B 7/007* (2013.01); *B28B 7/0073* (2013.01); *B28B 11/001* (2013.01); *B28B 11/12* (2013.01); *B28B 11/24* (2013.01); *B28B 19/00* (2013.01); *B44C 1/24* (2013.01); *B44C 5/0438* (2013.01); *B44C 5/0453* (2013.01); *B44F 9/04* (2013.01); *C04B 14/06* (2013.01); *C04B 24/2641* (2013.01); *C04B 28/065* (2013.01);
(Continued)

(58) Field of Classification Search
CPC . E04F 13/0873; E04F 13/141; E04F 13/0733; C04B 24/2641; C04B 14/06; C04B 28/065; C04B 2111/00482; B29C 33/42; B44F 9/04; B44C 5/0453; B44C 5/0438; B44C 1/24; B28B 7/0073; B28B 3/00; B28B 11/24; B28B 11/12; B28B 3/02; B28B 19/00; B28B 11/001; B28B 7/007
See application file for complete search history.

(56) References Cited

U.S. PATENT DOCUMENTS

| | | | |
|---|---|---|---|
| 1,583,516 A | 5/1926 | Anfield | |
| 2,095,642 A | 10/1937 | Knight | |

(Continued)

FOREIGN PATENT DOCUMENTS

EP    2644341 A1    10/2013

OTHER PUBLICATIONS

PCT Written Opinion of the Int. Searching Authority and International Search Report in PCT/US2016/61177.

*Primary Examiner* — Nathan L Van Sell
(74) *Attorney, Agent, or Firm* — Edward S. Sherman

(57) ABSTRACT

The appearance of natural rock faces are formed on planar panels or part portions disposed horizontally by stamping or texturizing a cementatious mixture of veneer material and then selectively applying colorant matter, which may include combinations of stains and mineral.

20 Claims, 11 Drawing Sheets

(51) Int. Cl.

| | | |
|---|---|---|
| *B44F 9/04* | (2006.01) | |
| *B44C 1/24* | (2006.01) | |
| *B44C 5/04* | (2006.01) | |
| *B28B 3/02* | (2006.01) | |
| *B28B 11/12* | (2006.01) | |
| *B28B 11/24* | (2006.01) | |
| *C04B 14/06* | (2006.01) | |
| *C04B 24/26* | (2006.01) | |
| *C04B 111/00* | (2006.01) | |
| *B29C 33/42* | (2006.01) | |
| *E04F 13/08* | (2006.01) | |
| *E04F 13/073* | (2006.01) | |
| *E04F 13/14* | (2006.01) | |

(52) U.S. Cl.
CPC ........ *E04F 13/0733* (2013.01); *E04F 13/141* (2013.01); *B29C 33/42* (2013.01); *C04B 2111/00482* (2013.01)

(56) References Cited

U.S. PATENT DOCUMENTS

| | | |
|---|---|---|
| 2,110,335 A | 3/1938 | Fritzer |
| 4,098,755 A | 4/1978 | Plunguian et al. |
| 4,420,525 A | 12/1983 | Parks |
| 5,133,621 A | 7/1992 | Gonzales |
| 5,447,752 A | 9/1995 | Cobb |
| 5,487,526 A | 1/1996 | Hupp |
| 5,735,094 A | 4/1998 | Zember |
| 6,588,452 B2 | 7/2003 | Ferguson |
| 6,616,874 B1 | 9/2003 | Lazar |
| 7,866,010 B2 | 1/2011 | Schofield |
| 8,182,605 B2 | 2/2012 | Wallner |
| 2004/0161546 A1 | 8/2004 | Clemmer |
| 2004/0261345 A1 | 12/2004 | McGrath |
| 2005/0188643 A1* | 9/2005 | McGrath ............ B44C 5/04 52/506.01 |
| 2005/6188643 | 9/2005 | McGrath |
| 2006/0027288 A1* | 2/2006 | Williams ............ B27D 1/10 144/144.51 |
| 2007/0056480 A1 | 3/2007 | Gray |
| 2007/0144080 A1 | 6/2007 | Berner |
| 2007/0217865 A1 | 9/2007 | Castonguay et al. |
| 2008/0120939 A1 | 5/2008 | Chang |
| 2009/0235600 A1 | 9/2009 | Logan et al. |
| 2011/0061323 A1 | 3/2011 | Schwartz et al. |
| 2013/0017016 A1 | 1/2013 | Castonguay et al. |
| 2014/0047790 A1 | 2/2014 | Ferronato |
| 2014/0272302 A1 | 9/2014 | Ciupera |
| 2014/0275349 A1* | 9/2014 | Setliff ............ C04B 28/021 524/5 |
| 2016/0059602 A1* | 3/2016 | Irwin ............ B41K 1/23 101/333 |

* cited by examiner

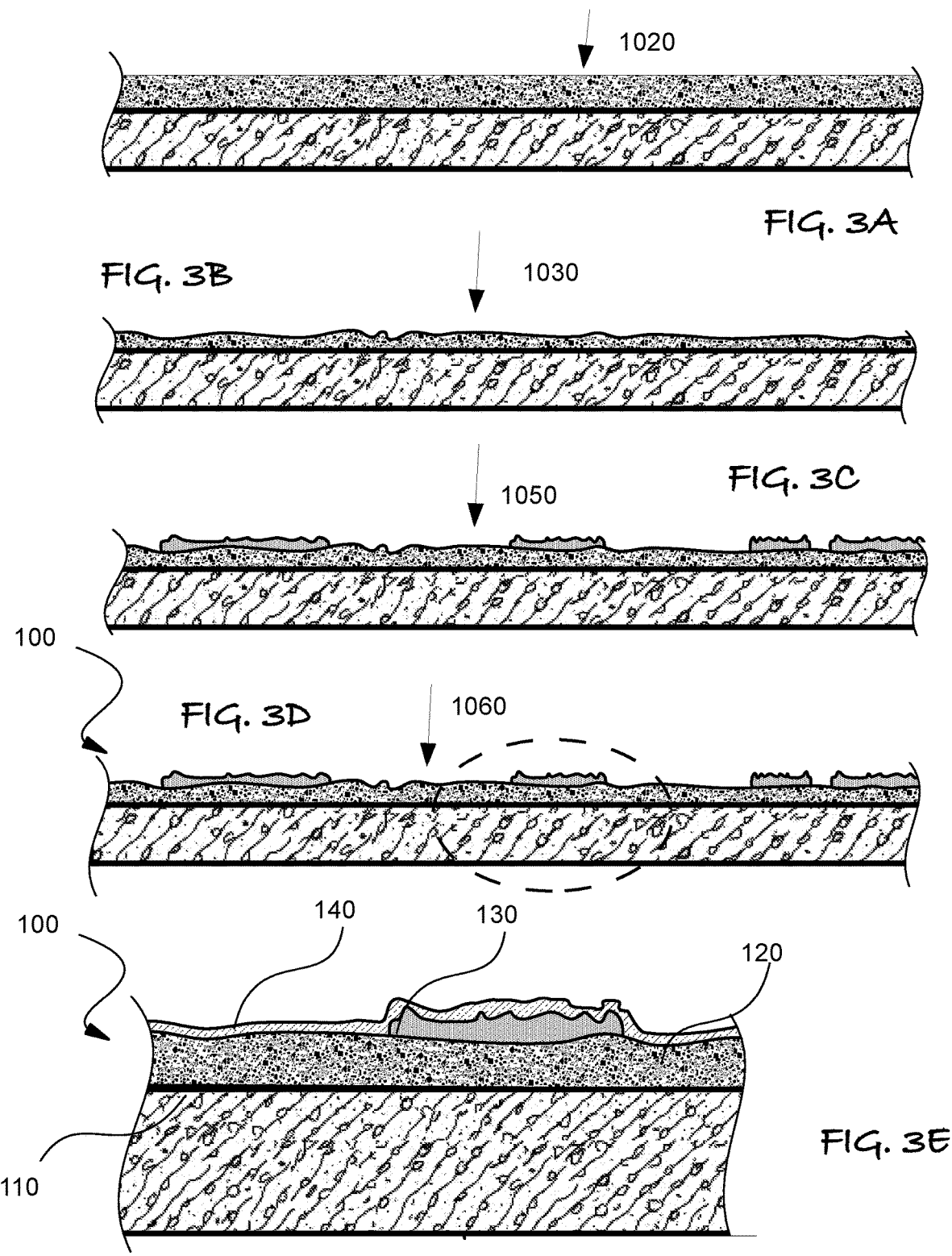

SIMULATED ROCK PANELS

CROSS REFERENCE TO RELATED APPLICATIONS

The present application claims the benefit of priority to the US Provisional Patent Application of the same title, which was filed on 9 Nov. 2015, having application No. 62/252,868, and is incorporated herein by reference.

The present application also claims the benefit of priority the PCT application of the same title, filed with the USPTO as the RO on 9 Nov. 2016, having international application no. PCT/US2016/061177, and is incorporated herein by reference.

BACKGROUND OF INVENTION

The field of inventions is building materials, and more particularly cementatious boards or panels as wall fascia to create the appearance of natural rock faces.

It is desirable to create vertical wall or building interior or exterior surface that have the appearance of natural rock faces, such as to simulate a building constructed in or carved from rock, or a natural rock cavity, such as a cave or waterfall. Such features can be used on exterior walls, over or around fireplaces, or in bathrooms, showers and bath enclosure, as well as outdoor landscaping features such as garden walls, swimming pools walls and fountains used to create the look of natural waterfalls.

Such rock appearing surface has been created by methods known generally as vertical concrete overlay. Current vertical concrete overlay methods are labor intensive and expensive due to the skilled workmanship of artisan's, and are hence cost prohibitive for average homeowners or businesses on a budget. It is also very difficult to stain and decorate the rock with liquids or viscous materials because of gravity and the work being done in a vertical position.

The largely vertical orientation of the fascia may preclude the placement of other viscous or powdered or granular materials used for coloring and pigmentation to achieve natural effects. Hence, a high level of skill is required to create a natural appearance over large areas. This trade specific art is not easily learned or performed by other trades.

The above and other objects, effects, features, and advantages of the present invention will become more apparent from the following description of the embodiments thereof taken in conjunction with the accompanying drawings

SUMMARY OF INVENTION

In the present invention, the first object is achieved by providing a panel member having a simulated rock face appearance, comprising at least one planar portion, a colored veneer layer deposited on an outer surface of the at least one planar portion, the colored veneer layer having an outer surface with a non-planar texture to resemble a natural rock face, a coloring layer deposited on selective portion of the outer surface of the colored veneer layer to create a contrasting color appearance to adjacent portions of the colored veneer layer A second aspect of the invention is characterized by the above panel in which the coloring layer comprises a coloring agent selected from the group consisting or concrete stain, natural pigments, natural minerals and artificial minerals.

Another aspect of the invention is characterized by any of the above panel members in which the coloring layer is selectively applied to regions of the colored veneer layer having a different texture than the adjacent portions of the veneer layer not covered by the coloring layer.

Another aspect of the invention is characterized by any of the above panel members in which the coloring layer comprises a coloring agent in which aggregate of at least one of natural minerals and artificial minerals is disposed in a concrete stain, in which the concrete stain at least partially penetrates into or adheres to the textured veneer layer.

The above and other objects, effects, features, and advantages of the present invention will become more apparent from the following description of the embodiments thereof taken in conjunction with the accompanying drawings.

BRIEF DESCRIPTION OF DRAWINGS

FIG. 3A-D schematically illustrate in cross-sectional elevations the transformation of the substrate in the process of FIG. 2, in which FIG. 3D is an enlarged view of the portion indicated by the encircling dashed line of FIG. 3E.

FIG. 8A is a plan view of the panels arranged after step in the process of FIG. 7, whereas

FIG. 9A is a plan view of the trimmed panels, whereas

FIG. 10A illustrates in a plan view the molds aligned with the trimmed substrate in the stamping process, whereas

DETAILED DESCRIPTION

Figure 1A:
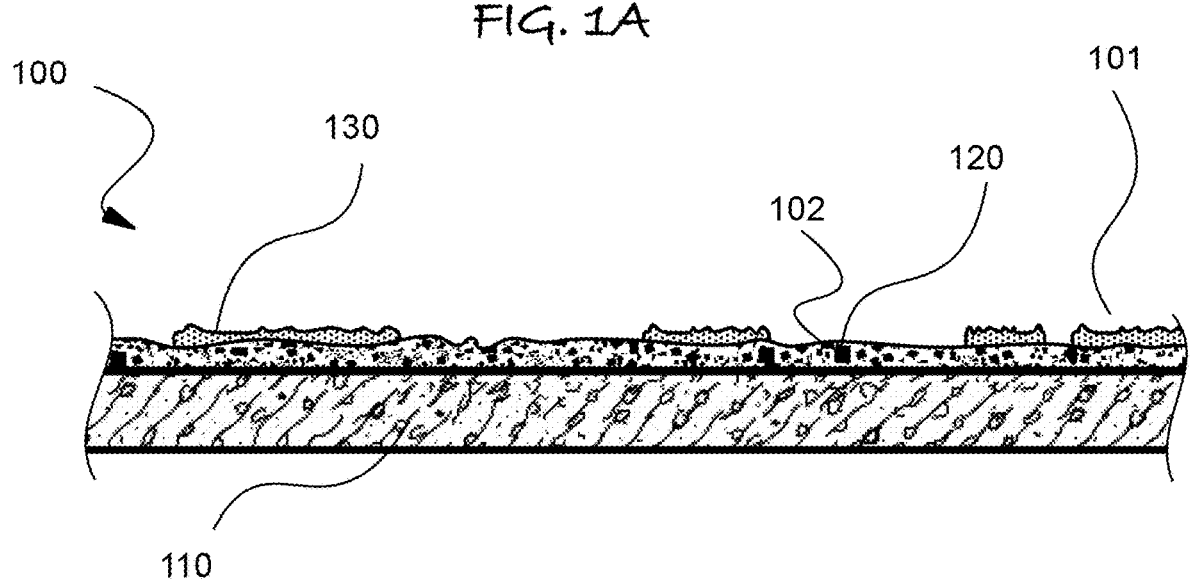
FIGS. 1A and 1B are schematic cross-sectional elevation of alternative panel formed according to the inventive methods illustrated in FIG. 2

Referring to FIGS. 1A through 11, wherein like reference numerals refer to like components in the various views, there is illustrated therein a new and improved Simulated Rock Panel, generally denominated 100 herein.

An objective is to create realistic large scale simulated rock surface by connecting panels. This poses several technical challenges that have been overcome by the various embodiments of the invention described below. Panels lend themselves to more automated manufacturing methods and to the decoration of smaller surface where vertical application techniques would neither practical nor cost effective.

In accordance with an embodiment of the present invention the Simulated Rock Panel 100 comprises a substrate 110, a veneer layer 120 disposed on the substrate and comprising from about 30 to 75% decorative aggregate and a partial application of contrasting colorant 130 over dispersed portions of the veneer layer 120. The veneer layer 120 has integral colorant to create an exterior region with a first surface appearance, and the partially applied colorant region 130 create a contrasting appearance, which together create an overall external appearance of natural rock faces and/or carved or naturally weathered rock.

The outer surface 100a of the panel 100 can have the appearance of igneous, metamorphic and sedimentary rock faces, as well as including embedded fossils, as well as weathered, eroded and precipitated deposits, such as limestone on the same.

Figure 2:
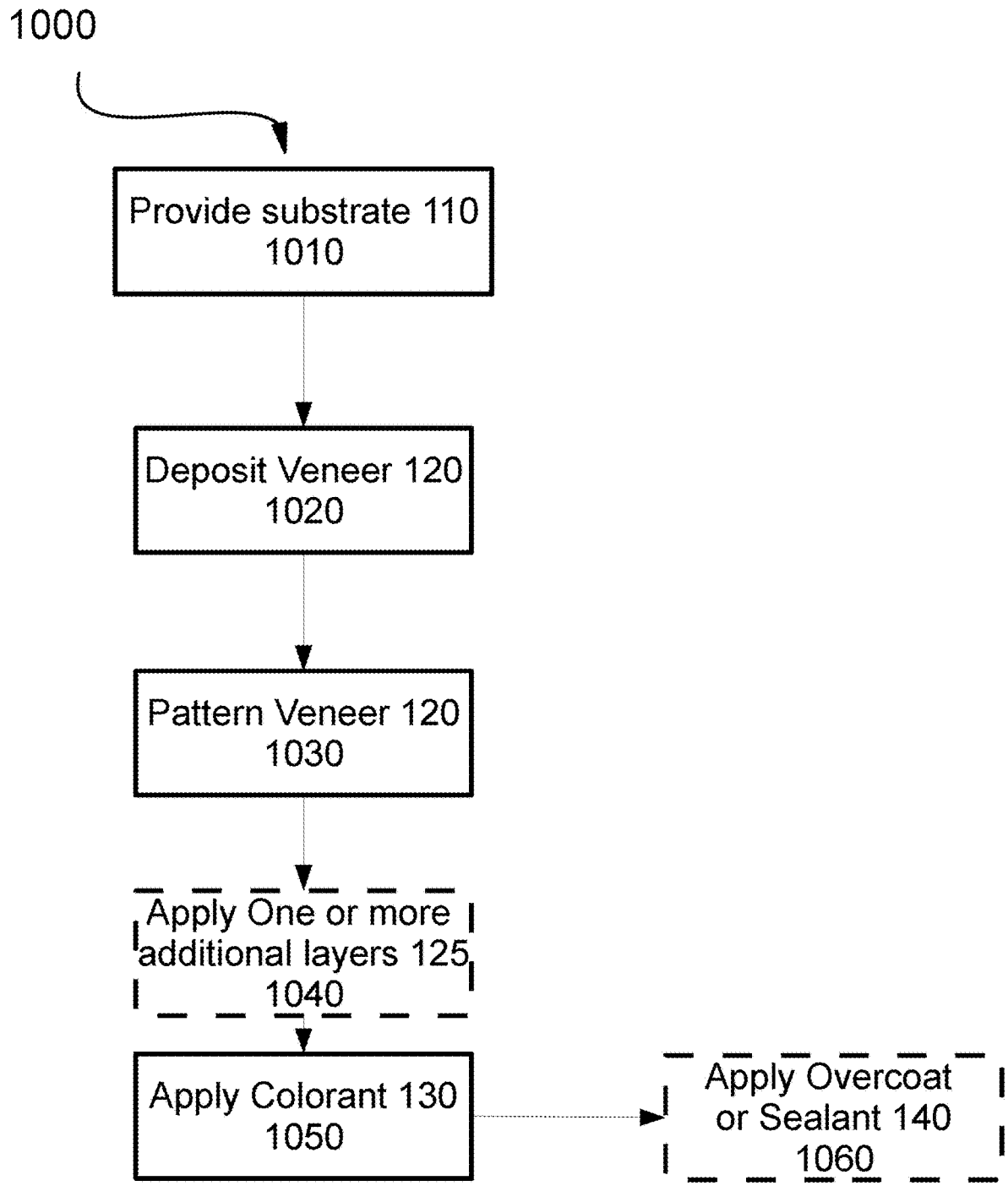
FIG. 2 is a flow chart of the fabrication method used to form the panel of FIGS. 1A, 1B, 3D and 3E.

In the application process 1000 of FIG. 2, the veneer layer 120 has integral color and is stamped or otherwise patterned (step 1030) after deposition in step 1020 to provide an external texture. The contrasting colorant 130 is selectively applied (step 1050) over the stamped or textured veneer layer 120 to create a rock like impression in which selective areas of relief or projections (101) have the colorant and other regions (102) do not, as shown in FIG. 1A.

In the texturing process of step 1030 it is first preferable that a liquid release agent is applied with a mechanical or pump sprayer. Then, rubber rock or wood texture stamps are used mechanically or manually to press the soft mixture enough to create a full impression of the natural rock or other natural surface desired. Another embodiment may be a reverse or 3D impression of a photograph of any particular design or shape including digital designs or other art work.

It should be understood that depending on the nature and complexity of the texturing step 1030 and subsequent steps it is preferable to deploy slow settable mixture for layer 120 to increase the working time for adding layers 130 and 125, particularly when such layers are mineral or aggregates, as for example in the subsequently described primary Mineral Layer (which is optionally placed in the wet mix prior to setting). Otherwise, the veneer stamped board 100 after step 1030 is allowed to set on a horizontal flat surface.

Figure 1B:
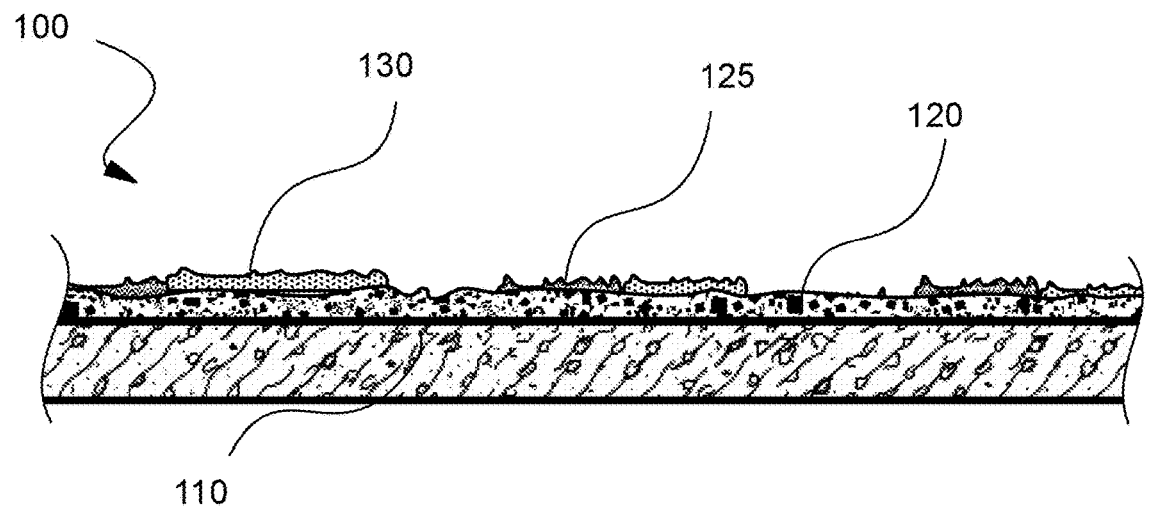

One or more additional full or partial layers 125 may be applied over the veneer layer 120, as illustrated in process 1000 in FIG. 2 at step 1040, with the resulting simulated rock panels shown in FIG. 1B.

In step 1040 and 105 for creating the coloring layer 130 and/or additional layers 125, fluid coloring material is optionally applied manually by hand with a roller or brush or mechanically such as a sprayer to achieve the desired natural look using liquid or powdered colorants, which can be added in this or subsequent steps. Fluid coloring materials include concrete stains and settable mixture of colorant that form a discrete layer, rather than a stained superstrate or upper portion of another layer.

Alternatively, in step 1040 and 1050 for creating the coloring layer 130 and/or additional layers 125, what can be considered a mineral layer having natural or synthetic pigments. such a layer is optionally applied by gluing or adhered to the cured surface using various techniques such as being sprayed or brushed on by hand. They are layered to create a natural expression of minerals, lichen, moss or other natural occurrences, in or on any other layer, including a prior mineral layer, either partially or adjacent to the mineral portion applied previously.

The one or more additional or partial layers 125 or the colorant layer 130 are optionally a mineral layer is applied over or within the veneer layer 120. It may consist of any type of pigments, natural or manmade minerals, or aggregates, shells, fossils or other materials with an organic or inorganic base. Glitters and or minerals etc. are layered or placed to mimic mineral deposits found in rock cliffs, boulders, river beds and untouched rock formations and their deposits and natural compositions found in nature or other worldly imagined rock formations. Natural earth pigments or particles mined from the earth or crushed and extracted from natural rock may be applied. Other materials used in the mineral layer may be used such as crushed glass, ground crystal, sea shells, hematite and various other manufactured metals and minerals, silver, gold including gold nuggets, gold leaf, diamonds, or other natural or synthetic material to produce a desired effect. Synthetic's including glitter made from plastic or other man made materials used to create a natural or simulated look of natural occurrences found in or on rock.

A Mineral Layer as layer 125 or 130 may be applied as per the following:

1. While veneer coat is wet.
2. Between wet veneer layers during a multiple wet layer process.
3. Using adhesives after veneer is set.
4. A mineral layer may be applied within or over color layer of acrylic latex or other pigment carrier such as lacquers etc.
5. During sealer coat.
6. Integrally within the sealer coat material or mixed in with the wet mix as described in veneer layer line 7 above. Such a coloring layer 125 and 130 may comprise a coloring agent in which aggregate of at least one of natural minerals and artificial minerals is disposed in a concrete stain, which may include pigmented carrier, in which the concrete stain at least partially penetrates into the textured veneer layer. It should be appreciated that the pigment used to create the stain is of much smaller particular size than the aggregate, and with the carrier would penetrate pores in the sold veneer. However, the aggregate would be adhered to the surface of the veneer without being colored by the pigment native to the stain. Hence, such colored regions 130 would create regions of mixed appearance in which the stain color, aggregate color and specularity differ from the solid colored veneer.

The minerals applied in this step 1040 or 1050 are optionally both natural minerals such as silver, gold, mica, iron pyrite, quartz, hematite etc. and synthetic such as glass, glitter etc. and is designed to replicate natural rock and optionally wood features.

It should be appreciated that with the horizontal orientation of panels 110 it is much easier to control the placement of the aggregate or granular materials used in the coloring layer and to provide patterns of color resembling natural rock.

The colorant layer 130 may optionally have an overcoat layer or sealer 140 that is transparent, step 1060 in FIG. 2, as shown in FIG. 3E. The colorant layer can 130 include a wide variety of materials components to create an appearance of partially exposed sub-strata in natural rocks.

The one or more additional full or partial layers 125 and colorant layer 130 can be applied by a broad range of processes using one or more compositions. The veneer layer and contrasting colorant are applied while the substrate panel is horizontal, permitting the use of automated equipment to create patterns characteristic of natural and weathered stone.

Further, the substrate 110, with the additional layers has a total thickness of from about ⅜ in. to about 1.25 in (about 10 mm to about 32 mm) that permits cutting and trimming with hand tools to allow on site fitting and installation directly to studs or wall board materials that are over studs, framing or other standard interior or exterior wall facings.

Figure 6:
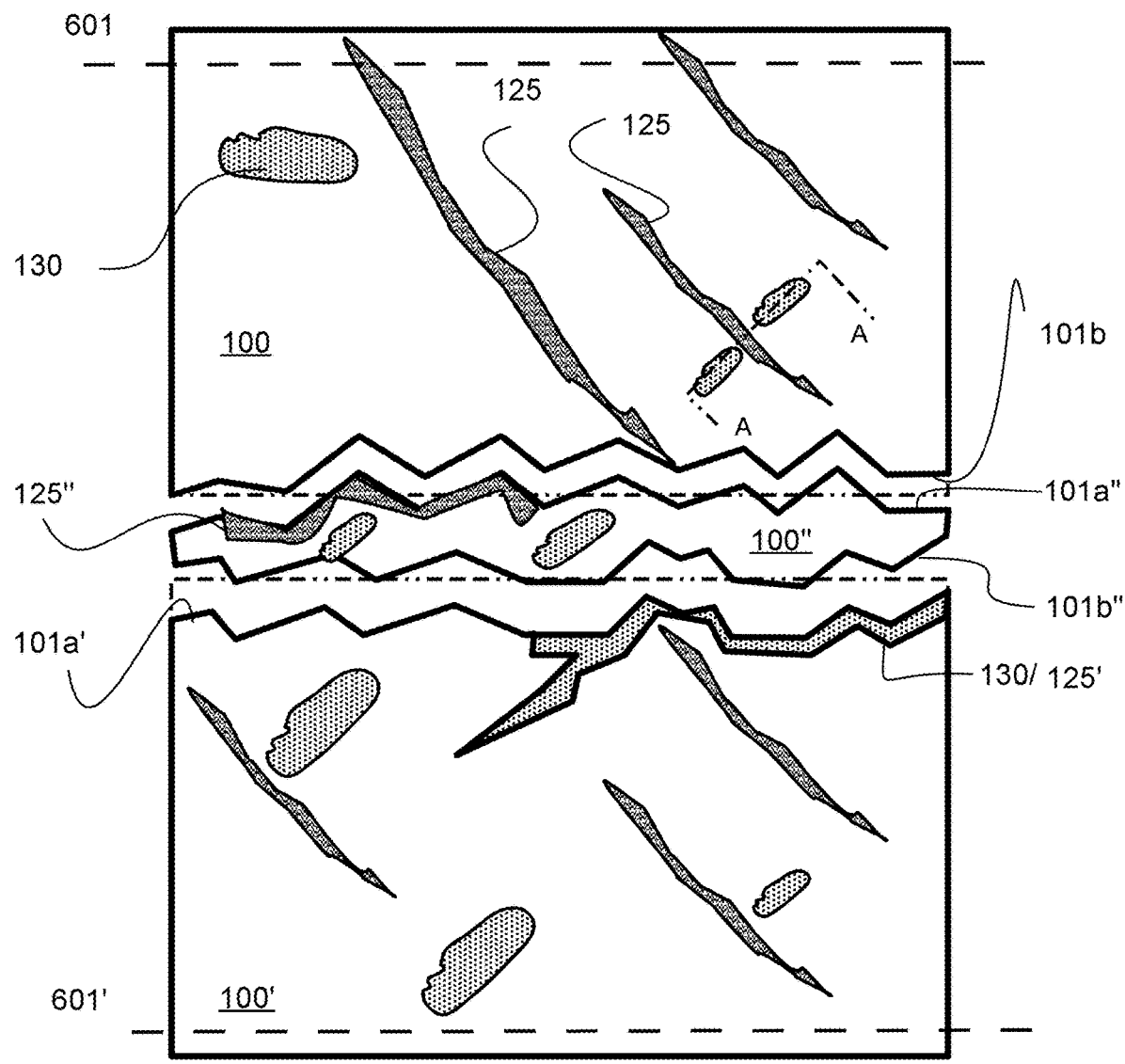
FIG. 6 is a schematic plan view of portions of a kit for installing multiple panels.

The substrate 100 preferably has dimensions of at least about 4'×8' so it can be cut or fitted with adjacent panels to adapt to any wall surface size. For installations around indoor bathtub enclosures in the US, 3'×5 panels are preferred. FIG. 6 illustrates in plan view select components of a kit that use multiple irregular panels to fit a bathtub enclosure and avoid lateral seams that appear artificial. Such a kit may also include the trim pieces illustrates in FIG. 4. During installation, the upper and lower panel in FIGS. 6, 100 and 100' respectively, are optionally cut to the size and shape before fitting to a wall above and alongside a bathtub. Field cutting is done on the straight side, such as at broken line 601 and 601'. Hence, the upper and lower portions can be trimmed horizontally to fit the wall height above the tub. It should be noted each panel 100 and 100' has a jagged, fractal or rock like upper and lower edge 101*b* and 101*b*' respectively were to seams will form. A filler panel 100" has matching upper and lower edge profiles 101*a*" and 101*b*". These matched fittable and filler panels combination are preferably supplied in a kit, along with one or more container of grout like colorant to match either veneer 120, coloring layer 130 or alternative layer 125.

To provide the panels in such kits, large rectangular panels 100 can be cut to desired shape before or after the layering process is deployed on a substrate 110. If a panel is cut to shape after layer deposition it is preferably in step 1030 to use a mold 210 having a dominant protrusion to cast a rocklike groove 501 (FIG. 5) at the location at which panels are cut to define the jagged edges 101*a*, 101*b*' and 101*a*" and 101*b*". The panel 100, 100' or 100" is then cut at this groove 501 to form the jagged edge.

Alternatively, the substrate 110 can also be factory cut or molded with jagged edges on a side that might be used as a seam. The edges that form seams are then optionally decorated with a mineral or colorant in layers 125" (in FIG. 6) and/or 130 to give the appearance of a natural rock vein at the seam location. The mold can also create this groove at the edge or a panel with a jagged edge. Hence, a seam formed between panels will appear to be a natural rock fracture, such as along a sedimentary deposit, or from the erosion of softer sedimentary material. It should also be noted that an upper right portion of panel 100' optionally has a vein like deposit of either colorant layer 130 or additional layer 125 along the opposing edge of filler panel 120. These groove like decoration 125'/130" and 125' can switch from one side of the seam to the other by alternating which adjacent panel they are on. It should be understood that miner or colorant can also be deposit on the inside of the mold 210 before pressing the wet concrete to form the veneer 110. The molding can be filled with a thin layer of water soluble/swellable gel to hold the mineral or coloring particulate when the mold 201 is inverted. Water soluble or other solvent removable adhesives can also be used, Panels are then shipped or transported to the site and installed similar to large sized tiles using adhesives or mortars typical to industry standards.

Panels can be also installed in a staggered configuration to create the appearance of rock seams, at the edge of adjacent panels, and panels can be cut or fractured in irregular shapes to cover edges seams or where one panels over laps one or more panels. It should be appreciated that jagged or irregular edge as described in this paragraph or with respect to FIG. 6 can be any size or shape, artistically designed to look like natural rock fissures, cracks or separations, where rocks are naturally set or layered upon or adjacent to each other.

Also, when panel trimming is required it is preferred that panel edges that meet walls, corners or ceilings are cut to minimize panel seams. Further, pre-cut irregular shapes formed prior to the stamping process of step 1030 can optionally be used to cover walls of any size, as for example, irregular shapes can be cut from 3'×5' panels, 4'×8' panels and then after the process of FIG. 2, attached to walls larger than 3'×5' or 4'×8', such as 8'×20' walls.

Another aspect of the invention is formed panels that can be assembled into a wall that simulates a rock face appearance that is seamless, that is does not have a periodic lines where adjacent panels have been placed side by sides and/or top to bottom.

It is also preferably to apply a rock line design to panels that has a natural appearance when the panels are joined on a vertical surface, and avoid tile lines.

This has been achieved in a more preferred embodiment by a using forming the planar support substrate in a shape corresponding to natural rock formation in which the edge roughness is on the order of size of at least the depth variation in the panels.

Figure 7:
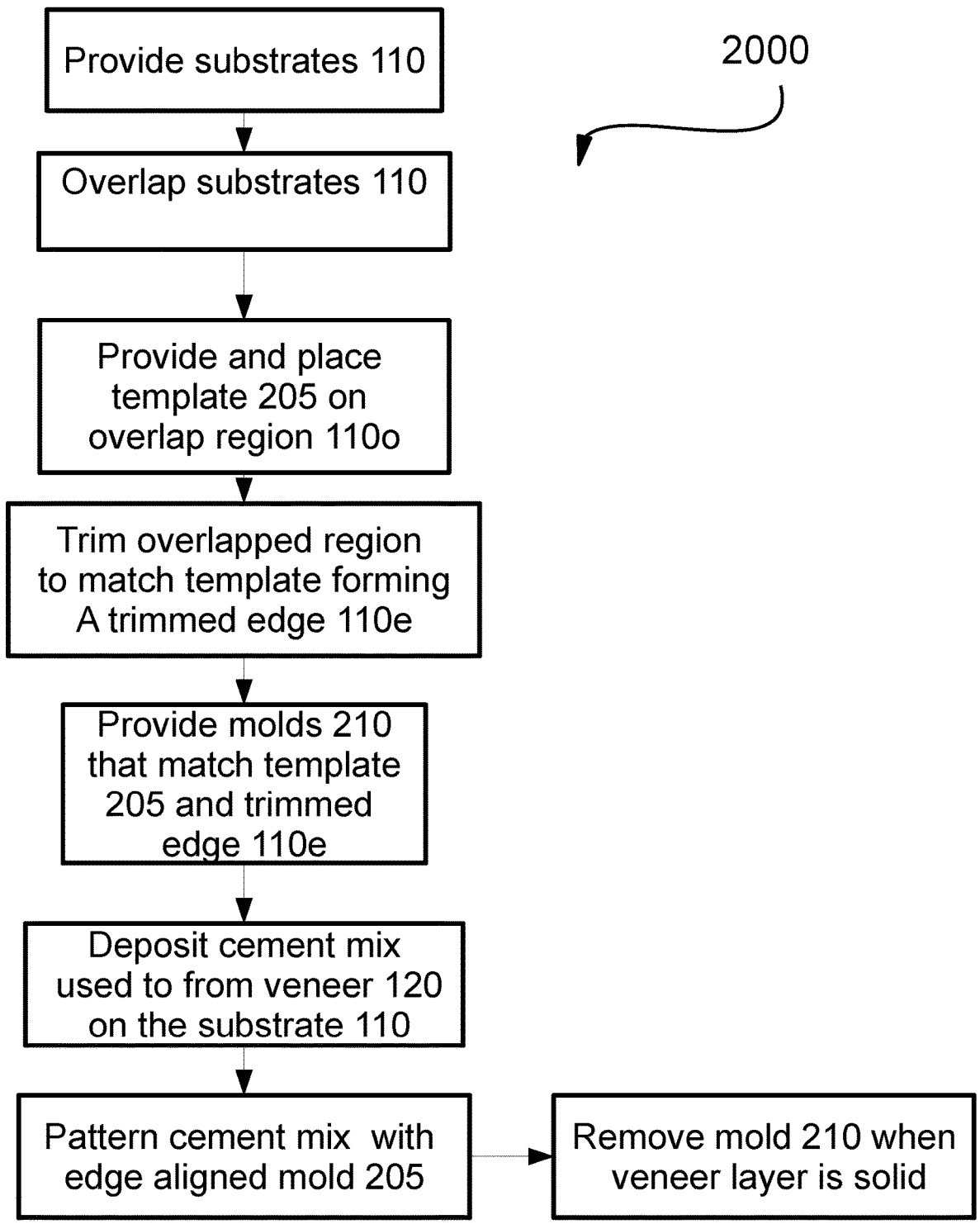
FIG. 7 flow chart of the fabrication method used to form the panel of FIG. 6 and other panels that are installed with a seamless appearance.
Figure 8A:
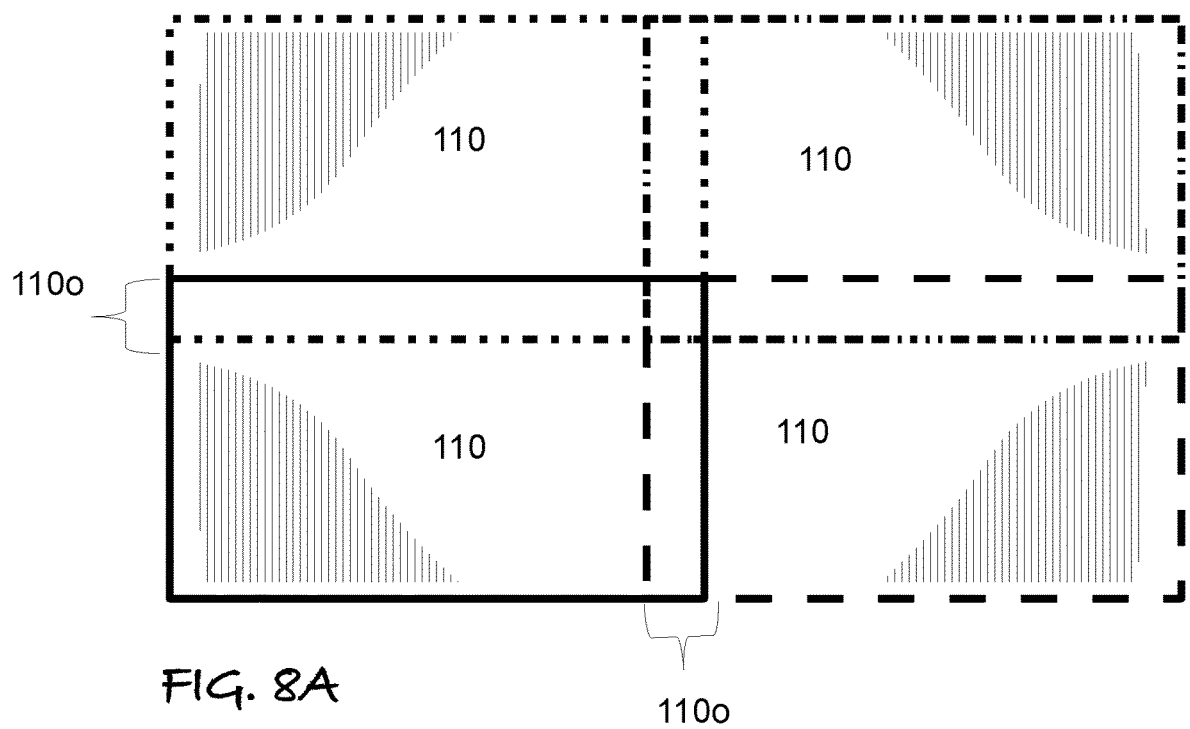
Figure 8B:
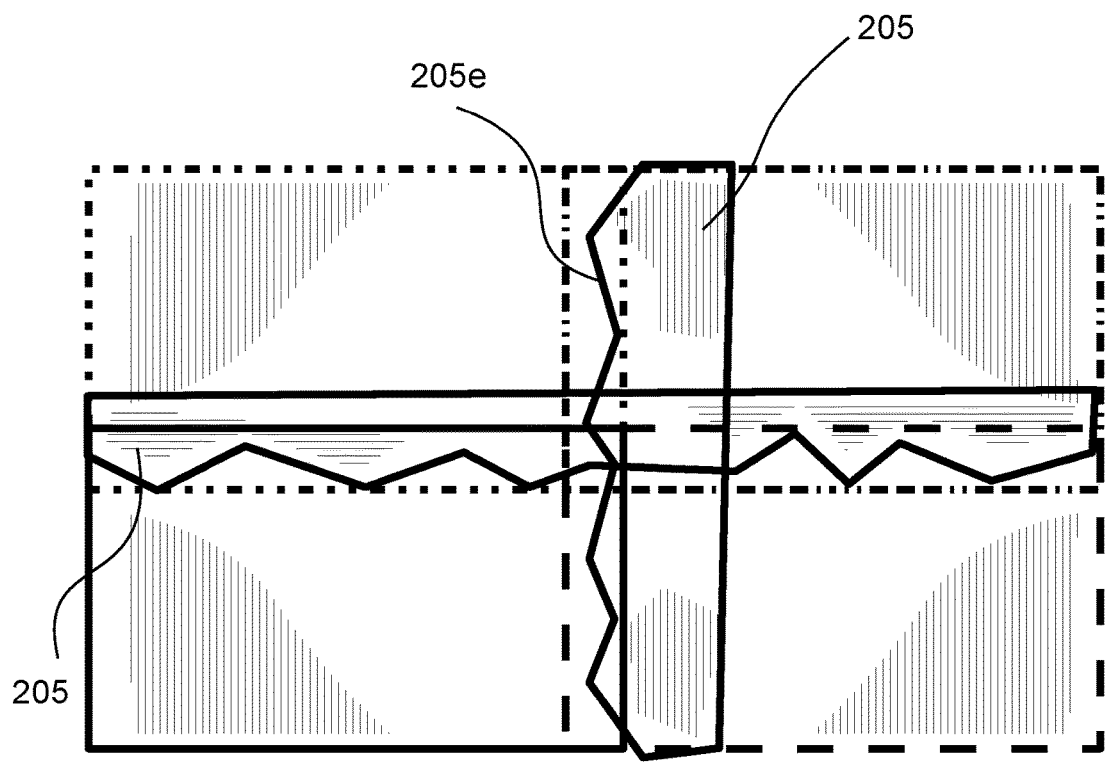
FIG. 8B is a plan view of the templates aligned to trim the overlapped panel regions.
Figure 9A:
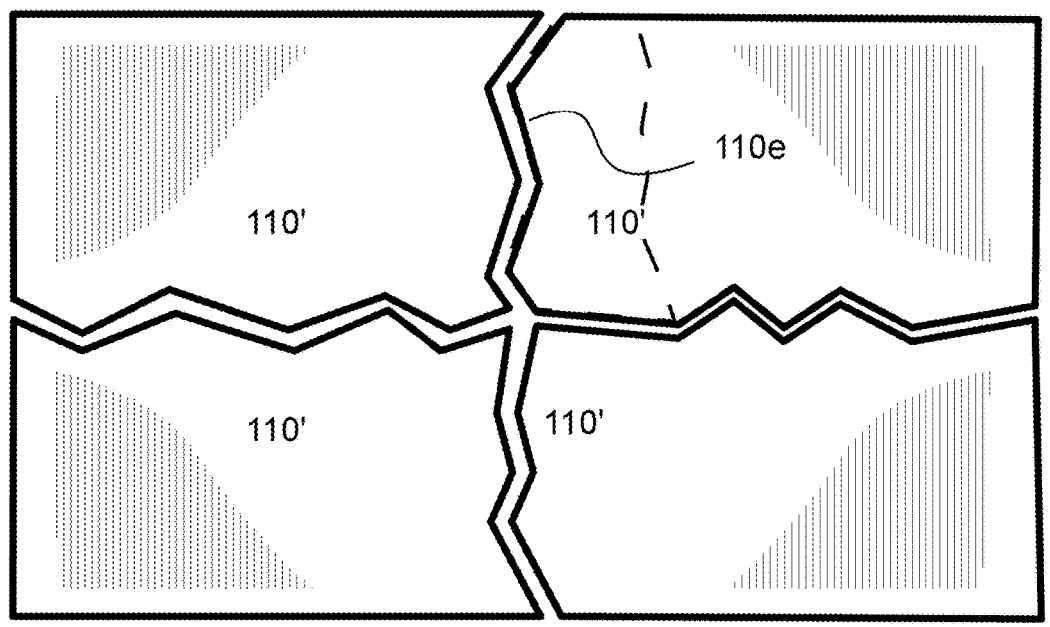
Figure 9B:
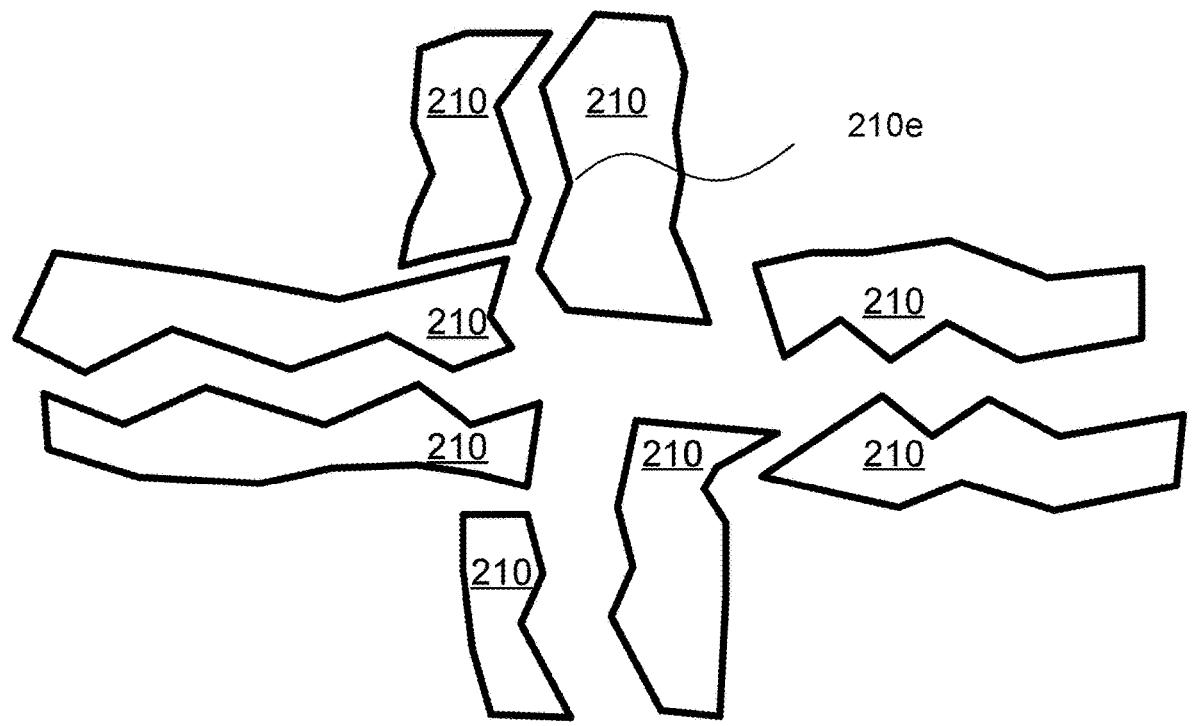
FIG. 9B is a plan view of the molds oriented to be aligned with the trimmed panel edges.

Completed panels that have matching edge seams that give the appearance of natural stone or rock formation can be obtained by process 2000 in FIG. 7. In this process, panels are first overlapped at one or more edges as shown in FIG. 8A, to proved an overlapped region on 1 or more adjacent sides 110*o*.

A template 205 is placed on the overlap region to define a cutting or trimming pattern for panels 110, in which each trimmed panel 110' will have a complementary edge with the other adjacent panel 110' and the template 205. The molds 210 have an edge contour 210*e* that matches the template 205 edge shape and the trimmed board edge 110*e*. After the fluid cement mix is placed at least on the portion of the board 110' proximal to edge 11*oe*, the mold 210 being aligned with the edge 110*e* is pressed therein to form a matching edge shape that rise in the $3^{rd}$ dimension upon curing. The mold 201 is removed after the mixture that forms the veneer layer 120 becomes sufficiently hard to be self supporting.

Alternatively, the panel 110' with the jagged edges 110*e* that matches the mold 210 edge 201*e* can be formed by other methods, such as casting, or cutting in a semi-fluid state, as well as using any machining or cutting method at the edge of planar panels with or without overlapping, such as by milling, sawing and water jet cutting, and the like. The mold edge 210*e* can be used instead of a template 205, and any numerically controlled cutting method need not use a physical template.

A realistic appearance at planar board edges 110*e* also requires forming deep impressions during the stamping/molding process. By forming panels that when fitted together have the deep impressions at the edge, the edge 110*e* is not noticeable, in part by being irregular, but more so, by not being readily apparent as it is hid by the shadowing and view obstruction in the adjacent panels. The jagged edge roughness or irregularly is based modeled on natural rock formation by creating molds from natural rocks.

Figure 10A:
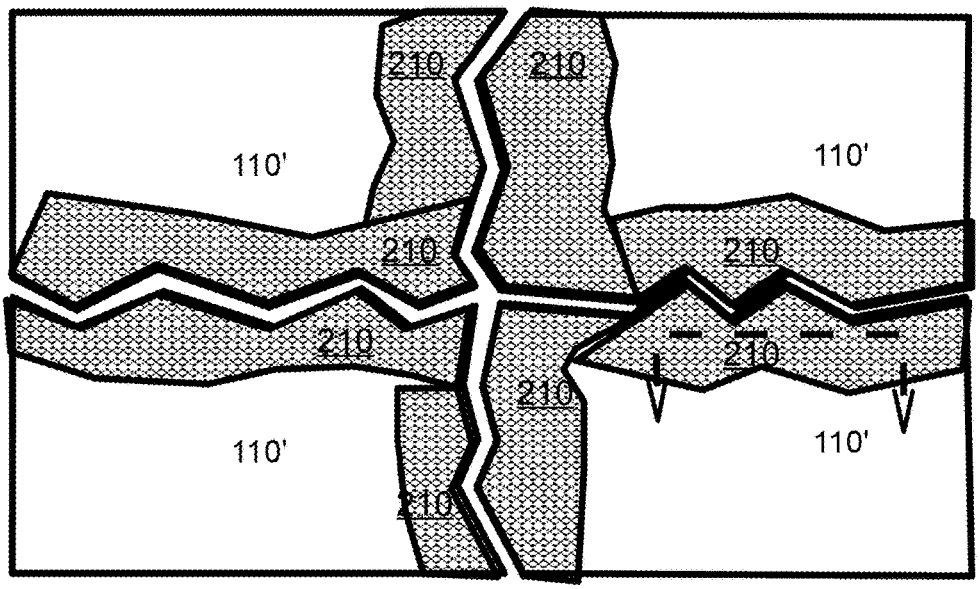
Figure 10B:
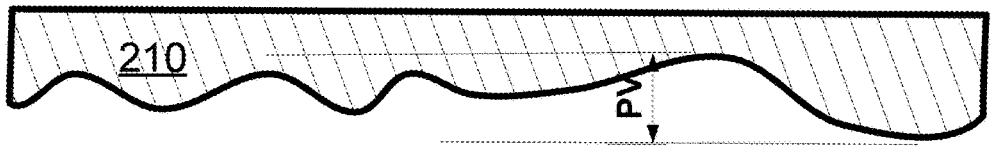
FIGS. 10B and 10C are section view of the mold and panel after molding respectively.
Figure 10C:
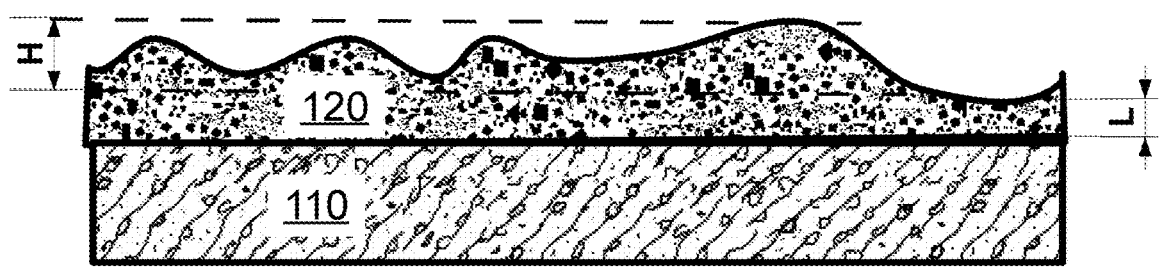
Figure 11:
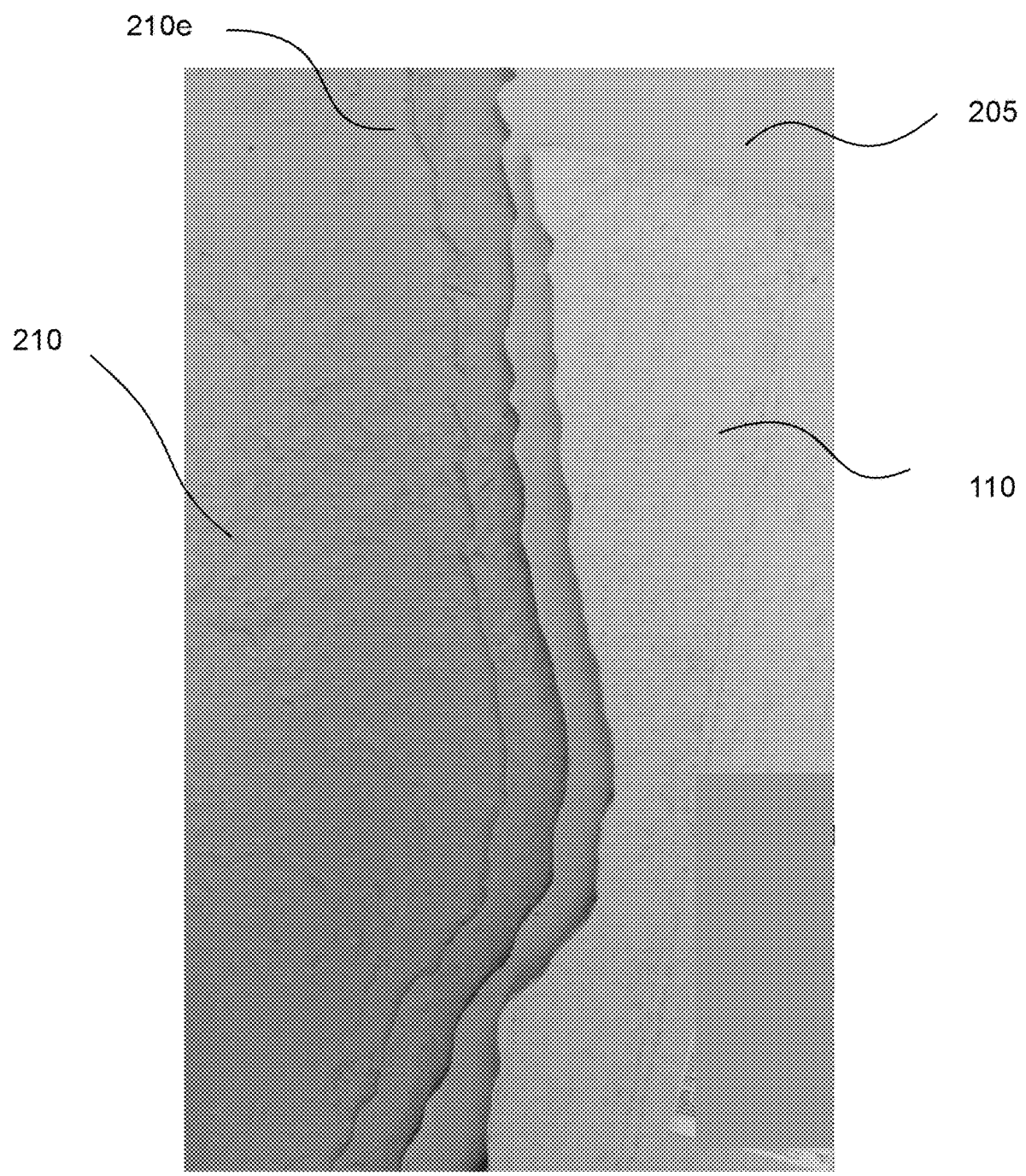
FIG. 11 is a plan view of the mold, template and substrate of the process of FIG. 7-10C.

More specifically, depths of material required to make a natural rock feature appearance should have a depth or thickest portion of ½" to 3" (12-75 mm) for the highest grade points off the face of the supporting board 110 (H in FIG. 10C). The lowest grade (L in FIG. 10C) $\frac{1}{32}$" to $\frac{1}{8}$" (0.5-3 mm), is the minimum depth or thinnest portions of the overlaid product off the face of the supporting board 110, providing a depth variation from the peak to valley (PV in FIG. 10B.) in the mold and board 110 of at least about 9 mm, but more preferably 10-74 mm. These depth variations are preferably on adjacent panel's edges to create the desired effect.

In many simulated rock materials, the depth variation is also preferably about the same in the variation of irregularly of the non-linear edge of the planar board 110 after molding the cementatious mixture to form a solid veneer 120 with the rock like appearance. The ranges are guidelines, as other rock formations, or even the pressing or artistic or fanciful shape in the panel or panel edges can be used to create other visual effects.

However, the range of depth variations that can provide the most natural rock appearances and invisible edge seams in adjacent panels, are rather challenging to fabricate on wide planar substrates 110. It should also be noted that the more preferred composition for forming any of veneer layer 120 have sufficient working time to apply additives, stains and colorants.

Given the above variations in thickness are preferred to provide a natural appearance at seams and panel edges, the fluid cementatious mixture must have a sufficiently low viscosity to flow into the deep areas of the mold during stamping, and an appropriate cure rate for production efficiency.

It has been discovered that at a desirable deep texture within or at the edge of the panels, such low viscosity fluid cementatious mixtures tend to shrink to rapidly on curing resulting in deleterious cracks and surface crazing. Crazing should be understood to be an array of small crack generally well distributed over the entire visible surface, of which at least some may extend downward to the planar substrate. The cracks and crazing is likely to worse in the further fabrication and handling make larger panels, such as 4×8' panels, as for example when the panels flex, and potentially lead to integrity failure, as well as customer rejection for obvious defects in workmanship.

A very soft or highly workable fluid cementatious mix with a high water to cement ratio is required to make large natural shapes on a horizontal surface by stamping with horizontal molds. Therefore, the challenge of horizontal stamping with molds on using a very soft material requires more moisture in the mixture which typically causes shrinkage cracking during the setting and curing process as well as reduces the overall strength of the finished product. The shrinkage cracks vary depending on the quality and quantity of polymer used in the mix. The shrinkage cracking also becomes more severe as the panel size is increased.

It is has been discovered that the shrinkage can be solved by using a high concentration of acrylic polymer to water ratio, provided the proper acrylic polymer is selected, or alternatively selecting a polymer latex that completely replaces water, as well as using any mixture of additive that can reduce shrinkage to avoid cracks at the desirable viscosity range for stamping.

A very soft or highly workable mix with a high water to cement ratio that achieves the desired depth when mold patterns are stamped on a horizontal surfaces has been found to be in the 9 to 11 slump range with 10-11 slump being most desirable. As the consistency and viscosity of the cement mixture before stamping with molds is somewhere between a very low viscosity self leveling concrete mix and convention molding and forming compositions (with slumps of about 2-5), it should be appreciated alternative formulations may deploy additive and polymers that are generally used for self leveling concrete.

It should also be understood that stiffer concrete mixture can probably be used with some vibration during the stamping process, as concrete mixture, being Bingham fluids, will drop in viscosity on the stress imposed by vibration.

According a preferred range of compositions generally comprise a mixture of a cement and sand in a ratio of 1 parts by weight cement to 1 part by weight sand up to about 1 parts by weight cement to 3 part by weight sand.

Colorants, pigments and natural and artificial miners can be added to this mixture in the dry state, or after is mixed with a fluid to give the desire viscosity range for stamping the desired patterns. It has been discovered that a polymer latex additive must replace all or some of the water in the mixture to avoid cracking or crazing on shrinkage. The following table provides examples of compositions and the resulting thicknesses in which cracks and crazes occur. The compositions all have 1 part by weight CSA type cement to 3 parts by weight sand. The indicated mixture of water to fluid polymer is by volume, with the total amount of fluid as a weight percent of the entire mixture is between about 18-22%. The range of fluid varies depending on the retained water in the sand or aggregate.

| Test No. | Latex type | % by volume water replacement | Thickness of the veneer 120 on the board 110 | Crazing and shrink cracking? |
|---|---|---|---|---|
| 1 | Sitka Latex R (Sika Corp, Lyndhurst, NJ) | 50 | 6 mm | Yes, 6 mm and above |
| 2 | Sitka Latex R (Sika Corp, Lyndhurst, NJ) | 100 | 6 mm | Yes, 8 mm and above |
| 3 | Mapei Latex Additive (Mapei, Deerfield Beach, VFL) | 50 | 6 mm | Yes, 6 mm and above |
| 4 | Mapei Latex Additive (Mapei, Deerfield Beach, VFL) | 100 | 8 mm | Yes, and above |
| 5 | Acry-Lock (W.R. Meadows, Inc., Hampshire, IL) | 50 | 8 mm | Yes, and above |
|   | Acry-Lock (W.R. Meadows, Inc., Hampshire, IL) | 100 |   | None up to 100 mm |

It should be appreciated that the above test formulation can have about 0 to of 5 weight % of other coloring additive and mineral without departing from the result. If more additive is desired, similar results can be obtaining by replacing some of the sand with such solid materials.

Substrate 110 is optionally any substrate, backer or lightweight substrate such as Cement board greatly recognized in the US as Hardy Board™ tile backer is prepared to desired size or shape of natural rock formation. Another substrate may be water resistant drywall, plywood, high density foam board or other. Substrate is primed with a concrete adhesive bonder according to manufacturer's instructions, such as Quikcrete®, Sakrete®, Weld-Crete®, CSI concrete bonder, etc. Also a cementatious slurry coat over plywood or foam board or other to provide an intermediate bond coat, which is commonly known within the industry.

Veneer layer 120 is optionally a non-Portland cement base; a mixture of:

1. Pure Calcium Sulfoaluminate Cement (CSA) approximately 15% to 50% of the mix designs.

2. (Aggregates of 30% to 75% of mix design) includes silica sand, different grades of crushed rock and or other aggregates can be used such as recycled material, ground glass and other materials designed to be used as aggregates in concrete mortar designs. Aggregate shape, sizing, gradation are determined by end use.

3. Acrylic Polymers+−5% of cement content designed for use in thin concrete applications including Forton™ Polytech's Polycure FT, ELOTEX® and BERMOCOLL® Redispersible Polymer Powders.

4. Polycarboxylate ether superplasticizers such as Riteks SP 7000, RussTech Admixtures™, Grace ADVA cast 555™ Zhengzhou Senhe TH41150™ and others, reduce water requirements improves workability and provides an ultra-high strength mix.

5. Set Retarder for CSA citric acid 0.02%-0.04% cement ratio provides optimal working time.

6. Pigments or dye for color.

Further, any pigments or colored dye or colored aggregates may be added at the end of the mixing cycle to produce random striations and layers to provide the look of metamorphic or sedimentary layers found in nature. (in description below)

It should be appreciates that these components may be substituted with other materials, including those developed or discovered in the future which provide the functions and benefits described below, and include pre-mixtures or mixture sets of the following or equivalent components.

1. Calcium sulfoaluminate cements (CSA). The largest manufacturer and user of pure CSA is China. It comes in varying degrees of strengths and grades depending on set times, overall strengths etc. Pure CSA cement is made by one manufacturer in the US (Rapid Set®) made by CTS cements in the USA. CSA cement provides early-age strength a denser microstructural formation and improved abrasion resistance and has lower CO2 emissions related to the manufacturing process than OPC, (ordinary Portland cement)

2. Addition of Polymers such as acrylic, styrene acrylic, and latex help to increase hydration time, improved tensile strength, and flexural strength and improve impact and abrasion resistance, water resistance, and chemical resistance, and provides a superior bonding ability to many different surfaces including plywood, Styrofoam of various densities.

3. Addition of high-range water reducer (HRWR) also known as Superpalsticizers, polycarboxylate ether-based superplasticizers (PCEs) or naphthalene, calcium lignosulfonate or other. Superpalsticizers are added to decreases the water requirements by neutralizing the surface charges on the cement particles which causes greater dispersion and viscosity of the working mixture. HRWR's increase workability and reduced air entrapment which provides a denser more water resistant and stronger final product.

4. Retarder for CSA (citric acid) is used to slow the mix set time. This allows working time for multiple layers and better production flow.

5. Silicate sand is added at a percentage of weight to cement. The sand mesh size is optionally varied depending upon the mix thickness and end use.

6. Integral color (concrete dye) is added for various base colors to the final product.

7. Pigments or colored dye or colored aggregates may be added at the end of the mixing cycle to produce random striations and layers to provide the look of metamorphic or sedimentary layers found in nature. (in description below).

Figure 5:
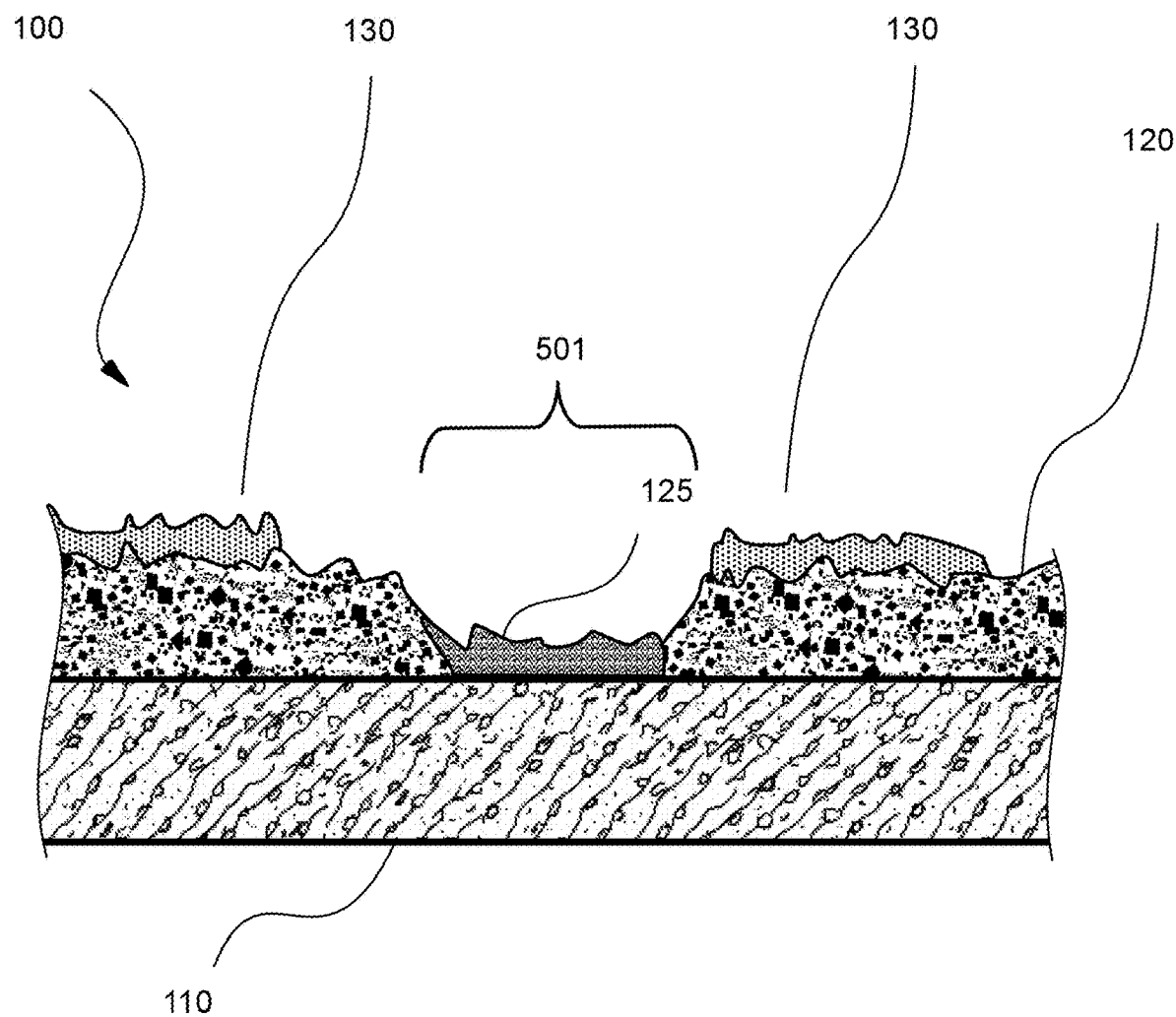
FIG. 5 is a schematic cross-sectional elevation that is enlarged to illustrate a portion of a panel.

The veneer mixture 120 is prepared to an acceptable trowel able or pourable or sprayable mixture for the veneer layer. The veneer compound is applied to the substrate using screed tools, or sprayed or troweled and or other machinery. The veneer compound is applied at a thickness commensurate with the thickness of the impression to be made. More veneer mix may or may not be applied to include multiple layers while still wet. This may include different colors of mix and or different sizes, types and colors of aggregates. These are different colored or textured layers are drizzled or placed randomly adjacent to or on top of other layers. Different layered compositions will create distinctive textural areas from heavy to fine within the final product. This may create ribbon or sediment layer effects within the product as you might find in sedimentary rock or metamorphic rock in nature, using the colorant layer and one or more optional layers 125. FIG. 5 illustrates a preferred embodiment of the method in which a protrusion in the mold forms a valley 501 in the veneer layer 120. The valley 501 may extend to the near the substrate 110. The valley 501 is covered with the additional or partial layer 125 to create the appearance of a sedimentary vein in rock, and the coloring layer 130 is applied to regions around it. The rock like appearance created is shown in plan view in FIG. 6, in which section line A-A refers to FIG. 5. Region 125' is an additional layer applied at an inchoate jagged seam to be formed when panels 100, 100' and 100" are brought together on a vertical surface.

Additional or partial layers 125 can include any of the materials and composition of the coloring layer 130, but are intended to create a contrasting appearance from at least one of the veneer layer 120 and preferably also the coloring layer 130 from one or more of difference in texture, gloss, specularity, color and color variation with lighting conditions, such as color temperature of the light source and optionally have fluorescent and/or phosphorescent properties.

Overcoat or sealant 140 is optionally a sealer or epoxy coating with or without a protective polyurethane protective coating following the epoxy later. The epoxy layer may or may not be applied to include different types of epoxies to create the desired effects. Countertop epoxy will fill the natural voids to create a smooth surface, where desired, and may or may not include a protective coating depending on the location and final use of the product. Standard and advanced concrete sealer coats may be applied in a single or multiple coat application. Different sealers may be required for different applications such as wet, heat, sun exposure or interior or durability requirements such as foot or vehicular traffic. The type of sealer used and its applications is based on the desired protection and intended end use of the product.

In another embodiment for creating layer 125 and 130, a high solids two part or three part epoxy may be applied to fill the impressions in the rock surface creating a smooth or semi smooth, clear top coating to be used in various locations and if desired, a smooth glass like surface is achieved. Pigmented Epoxy may also be used in different layers to create different aesthetics including mineral and metallic effects embedded in the epoxy layer. A sealer coat or clear coat may be applied which includes reflective particles or minerals to include another or different mineral layer as mentioned in the sections above.

The colorant layer 130 or additional or partial layers 125 may be applied in steps 1040 and 1050 by different layering techniques done by hand or machine. The layers may be different colors or aggregates or both so as to integrally blend base colors to further mimic natural formations of rock. Multiple layered veneers are optionally implemented to create a natural effect. Multiple layers may be applied while mix is still in the wet or plastic stage or while set and still in active stage of curing time. Layers 125 and 130 may be poured, drizzled, troweled or splattered or other procedures which are manipulated by hand or machine to any desired form or design.

The color layer 130 and additional or partial layers 125 are also optionally may have powdered pigments, aggregates of various sizes or other materials, dry or wet, sandwiched between the wet mixes that are layered. This step replicates natural sedimentary and metamorphic phenomena found in natural rock. The additional powdered pigments, minerals and the like can also be added to the top of the veneer layer 120 by being sprinkled or spray on the inside of the mold 210 before stamping, and adhered using water or other soluble adhesives, such as polymer gels, so they stick to the inside of the mold 201 when it is inverted.

The color layer 130 and Additional or Partial Layers 125 is also optionally concrete stain of any particular type including powders or liquids of natural or synthetic pigments. The carrier may be applied as a dry pigment or liquid stain applied with a roller, brush or sprayer to achieve the desired effect. It may also be a solid medium such as chalk, wax or other solid pigment medium.

Figure 4A:
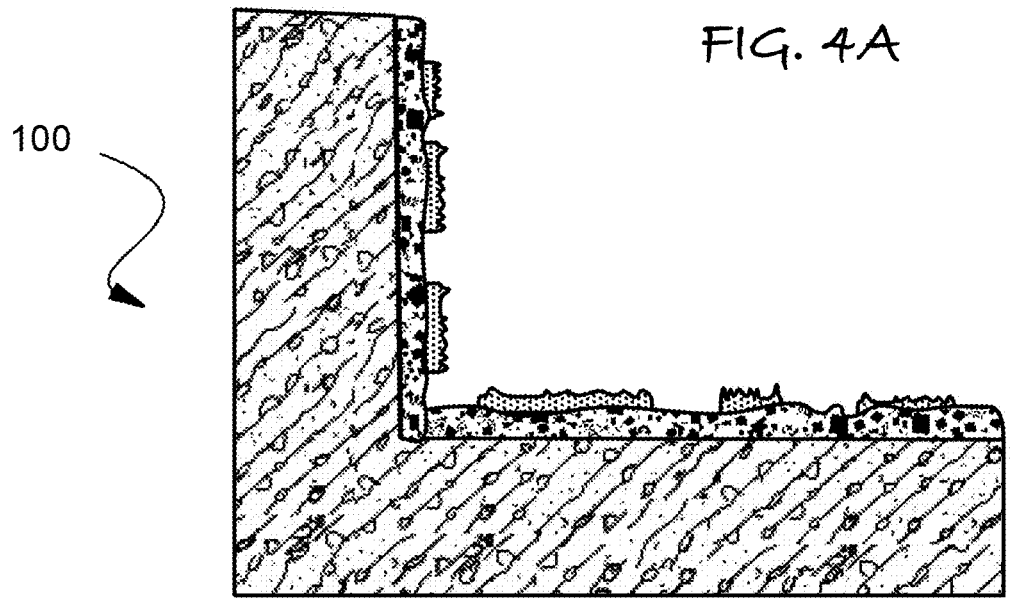
FIGS. 4A and 4B schematically illustrate in cross-sectional elevations alternative embodiments of the inventions in which the process of FIG. 2 is deployed to add multiple layers to substrates having multiple planar portions that intersect at right angle for use as cove and edge molding to cover seams in panel joints and wall corners and edges.
Figure 4B:
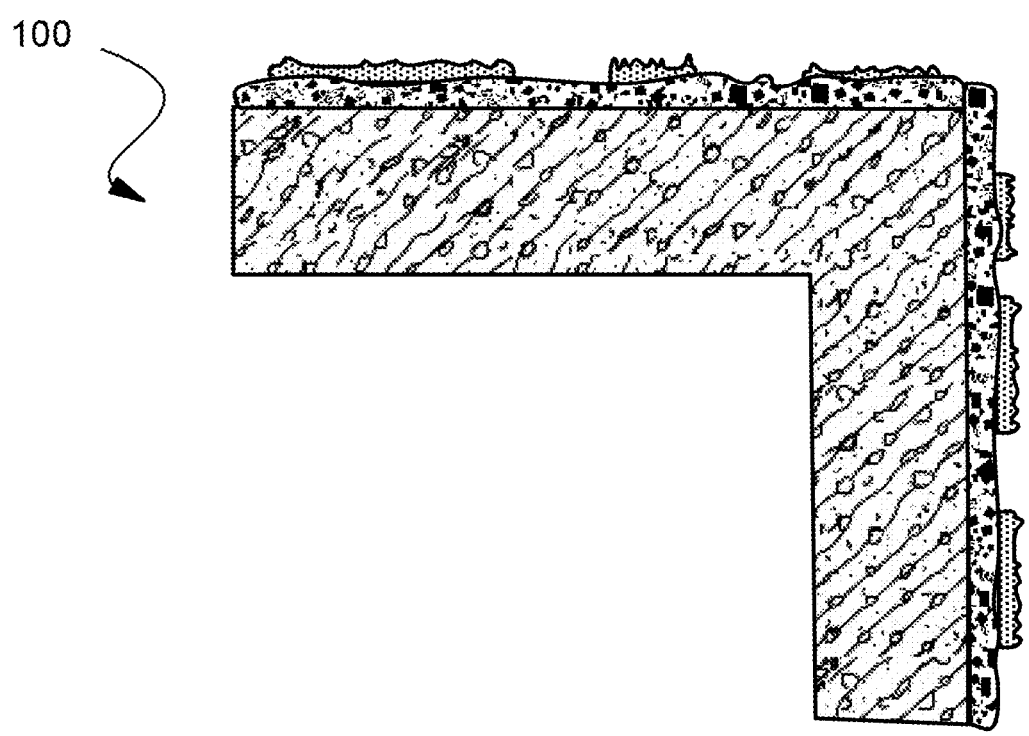

FIGS. 4A and 4B schematically illustrate in cross-sectional elevations alternative embodiments of the inventions in which the process of FIG. 2 is deployed to add multiple layers to substrates having multiple planar portions that intersect at right angle for use as cove and edge molding to cover seams in panel joints and wall corners and edges.

In summary, the inventive processes, articles, and compositions of matter provide the following commercial benefits and advantages in creating largely patternless large sized natural rock impressions (without a pattern type texture) implemented in a light weight thin panel of cementatious matter over cement board, plywood or foam board etc.

In particular the disclosed process for manufacturing impression stamped panels horizontally provides the following advantages: Speed of manufacturing, Reduction in labor costs, Ability to use a more viscous material for the veneer layer (120)

Further, a better quality product in some aspects is achieved due to working on a horizontally rather than vertically by the ability to color and stain liquids without running prior to set up. The process also allows time for dry materials applied with adhesives to resist sagging prior to setting up.

Further, the method of step 1030 of stamping concrete intended for vertical use on a horizontal surface provides off site manufacturing, speed of fabrication, and reduces the requirement for specialty skilled workers for manufacturing and installation skill requirements are reduced. This product makes this type of work available to handypersons and people with general trade level skill sets. The quality of the work is also improved because the manufacturing is done on a horizontal surface where different layers, coloring and other decorative techniques are possible that cannot be done in vertical positions or applications.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A method of fabricating panels for joining edge to edge to provide a simulated rock surface, the method comprising the steps of:
   a) providing at least 2 planar support panels, including a first panel having a first non-linear peripheral edge region and the second panel having a second non-linear edge region which is complimentary to the first non-linear edge region,
   b) providing a first stamping mold having at least one edge conforming to the first non-linear peripheral edge region,
   c) providing a second stamping mold having at least one edge conforming to the second non-linear peripheral edge region,
   d) applying a fluid cementitious mixture to at least the portion of each of the first and second panels proximal to the non-linear edge region,
   e) aligning the conforming edge of each of the first and second stamping molds to the conforming edge of the first and second panels,
   f) impressing the first and second stamping molds into the aligned panel to form an exterior surface of the fluid cementitious mixture that compliments the interior surface of the associated stamping mold,
   g) curing the fluid cementitious mixture to at least a self-supporting state,
   h) removing the first and second stamping molds from the cured self-supporting cementitious mixture.

2. The method of fabricating panels for joining edge to edge to provide a simulated rock surface according to claim 1 in which each planar panel is covered with the cured cementitious mixture to a depth of at least 0.5 mm and less than 75 mm to provide a depth variation between a highest position on each panel and a lowest position on each panel that is between 10 to 75 mm in which the first and second peripheral edges of the planar panels are covered with the cured cementitious mixture to provide a variation in thickness that is at least equal to the depth variation between the highest position on each panel and the lowest position on each panel.

3. The method of fabricating panels for joining edge to edge to provide a simulated rock surface according to claim 1 in which the fluid cementitious mixture has a slump range from about 9 to about 11.

4. The method of fabricating panels for joining edge to edge to provide a simulated rock surface according to claim 2 in which the fluid cementitious mixture has a slump range from about 10 to 11.

5. The method of fabricating panels for joining edge to edge to provide a simulated rock surface according to claim 1 in which each of the first and second stamping molds provides a variation in a peak to valley height of the cured self-supporting cementitious mixture is at least about 9 mm.

6. The method of fabricating panels for joining edge to edge to provide a simulated rock surface according to claim 4 in which each of the first and second stamping molds provides a variation in a peak to valley height of the cured self-supporting cementitious mixture of at least about 9 mm.

7. The method of fabricating panels for joining edge to edge to provide a simulated rock surface according to claim 1 in which fluid cementitious mixture comprises a calcium sulfoaluminate cement mixed with a polymer additive comprises between about 15% to 50% by weight CSA and between about 30% to 75% by weight of one or more aggregates in which substantially all of the water in the fluid cementitious mixture is from a polymer latex that provides a polymer additive.

8. The method of fabricating panels for joining edge to edge to provide a simulated rock surface according to claim 1 in which fluid cementitious mixture comprises a calcium sulfoaluminate cement mixed with a polymer additive.

9. The method of fabricating panels for joining edge to edge to provide a simulated rock surface according to claim 1 further comprising the step of applying a coloring layer on a selective portion of the exterior surface of the cured fluid cementitious mixture after said step of removing at least one of the first and second stamping molds to create a contrasting color appearance to adjacent portions of the exterior surface of the cured fluid cementitious mixture.

10. The method of fabricating panels for joining edge to edge to provide a simulated rock surface according to claim 9 wherein the coloring layer is applied along the non-linear edge region of at least one of the first and second panels.

11. The method of fabricating panels for joining edge to edge to provide a simulated rock surface according to claim 9 wherein the coloring layer is applied along a portion of the non-linear edge region of the first panel and along a portion of the non-linear edge region of the second panels in which the resulting colored region appears to be continuous when the first and second panels are joined at the complimentary non-linear edge regions.

12. The method of fabricating panels for joining edge to edge to provide a simulated rock surface according to claim 11 in which the coloring layer is applied to alternating adjacent non-linear regions of the first and second panels such that when the first and second panels are joined at the complimentary non-linear edge regions to form a seam the colored region alternates between opposing sides of the seams along a length of the seam.

13. A method of fabricating panels for joining edge to edge to provide a simulated rock surface, the method comprising the steps of:
  a) providing a plurality of planar support panels, each panel having peripheral edge region,
  b) overlapping the peripheral edge regions of 2 or more panels in the plurality to provide one or more overlapping regions,
  c) applying one or more templates having an edge pattern to at least one overlapping region to define a trimming pattern for the 2 or more adjacent panels that overlap,
  d) cutting the overlapping regions 2 of the one or more adjacent panels that overlap in accordance with the template to provide a trimmed edge to each of the 2 or more overlapped panels, each panel having a first or second trimmed edge that are complementary,
  e) separating laterally each of the 2 or more overlapped panels,
  f) providing a first stamping mold having at least one edge conforming to a first side of the trimming pattern and the first trimmed edge of the one or more panels, the trimming pattern having a second side that is complementary to the first side,
  g) providing a second stamping mold having at least one edge conforming to the second side of the trimming pattern and the second trimmed edge of the one or more panels,
  h) applying a fluid cementitious mixture to at least the portion of each of the 2 or more panels proximal to the trimmed edge,
  i) aligning the conforming edge of each of the first and second stamping molds to the conforming side of the associated 2 or more panels,
  j) impressing the first and second stamping molds into the aligned panel to form an exterior surface of the fluid cementitious mixture that compliments the interior surface of the associated stamping mold,
  k) curing the fluid cementitious mixture to at least a self-supporting state,
  l) removing the first and second stamping molds from the cured self-supporting cementitious mixture
  in which each planar panel is covered with the cured cementitious mixture to a depth of at least 0.5 mm and less than 75 mm to provide a depth variation between a highest position on each panel and a lowest position on each panel that is between 10-75 mm in which the first and second peripheral edges of the planar panels are covered with the cured cementitious mixture to provide a variation in thickness that is at least equal to the depth variation between the highest position on each panel and the lowest position on each panel.

14. The method of fabricating panels for joining edge to edge to provide a simulated rock surface according to claim 13 in which each of the first and second molds has a first variation in depth in at least a portion proximal to the conforming edge thereof, and each of the first and second non-linear edge regions having a plurality of edge contour variation that are comparable in dimension to the first variation in depth of the first and second stamping molds.

15. The method of fabricating panels for joining edge to edge to provide a simulated rock surface according to claim 13 in which the fluid cementitious mixture has a slump range from about 9 to about 11.

16. The method of fabricating panels for joining edge to edge to provide a simulated rock surface according to claim 15 in which the fluid cementitious mixture has a slump range from about 10 to 11.

17. The method of fabricating panels for joining edge to edge to provide a simulated rock surface according to claim 13 in which each of the first and second stamping molds provides a variation in a peak to valley height of the cured self-supporting cementitious mixture is least about 9 mm.

18. The method of fabricating panels for joining edge to edge to provide a simulated rock surface according to claim 13 in which fluid cementitious mixture comprises a calcium sulfoaluminate cement mixed with a polymer additive.

19. The method of fabricating panels for joining edge to edge to provide a simulated rock surface according to claim 13 further comprising the step of applying a coloring layer on a selective portion of the exterior surface of the cured fluid cementitious mixture after said step of removing at least one of the first and second stamping molds to create a contrasting color appearance to adjacent portions of the exterior surface of the cured fluid cementitious mixture.

20. A method of fabricating panels for joining edge to edge to provide a simulated rock surface, the method comprising the steps of:
  a) providing at least 2 planar support panels, including a first panel having a first non-linear peripheral edge region and the second panel having a second non-linear edge region which is complimentary to the first non-linear edge region,
  b) providing a first stamping mold having at least one edge conforming to the first non-linear peripheral edge region,
  c) providing a second stamping mold having at least one edge conforming to the second non-linear peripheral edge region,
  d) applying a fluid cementitious mixture to at least the portion of each of the first and second panels proximal to the non-linear edge region,
  e) aligning the conforming edge of each of the first and second stamping molds to the conforming edge of the first and second panels,
  f) impressing the first and second stamping molds into the aligned panel to form an exterior surface of the fluid cementitious mixture that compliments the interior surface of the associated stamping mold,
g) curing the fluid cementitious mixture to at least a self-supporting state,
h) removing the first and second stamping molds from the cured self-supporting cementitious mixture in which fluid cementitious mixture comprises a calcium sulfoaluminate cement (CSA) mixed with a polymer additive in which each planar panel is covered with the cured cementitious mixture to a depth of at least 6 mm and is substantially free of cracks and crazes therein.

* * * * *